US007752013B1

(12) United States Patent
Broyles (10) Patent No.: US 7,752,013 B1
(45) Date of Patent: Jul. 6, 2010

(54) DETERMINING ABERRANT SERVER VARIANCE

(75) Inventor: Daniel Stewart Broyles, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 277 days.

(21) Appl. No.: 11/410,403

(22) Filed: Apr. 25, 2006

(51) Int. Cl.
*G06F 11/30* (2006.01)
*G06F 15/173* (2006.01)
*G06F 11/00* (2006.01)

(52) U.S. Cl. .......................... 702/182; 709/224; 714/47
(58) Field of Classification Search ....................... None
See application file for complete search history.

(56) References Cited

U.S. PATENT DOCUMENTS

| | | | | |
|---|---|---|---|---|
| 5,105,372 | A * | 4/1992 | Provost et al. | 702/185 |
| 6,571,285 | B1 * | 5/2003 | Groath et al. | 709/223 |
| 6,985,901 | B1 * | 1/2006 | Sachse et al. | 707/10 |
| 7,210,073 | B1 * | 4/2007 | Landwehr et al. | 714/47 |
| 2002/0198984 | A1 * | 12/2002 | Goldstein et al. | 709/224 |
| 2002/0198985 | A1 * | 12/2002 | Fraenkel et al. | 709/224 |
| 2003/0005024 | A1 * | 1/2003 | Grumann | 709/102 |
| 2003/0065986 | A1 * | 4/2003 | Fraenkel et al. | 714/47 |
| 2003/0088529 | A1 * | 5/2003 | Klinker et al. | 706/3 |
| 2003/0101262 | A1 * | 5/2003 | Godwin | 709/224 |
| 2003/0149578 | A1 * | 8/2003 | Wong | 705/1 |
| 2003/0195718 | A1 * | 10/2003 | Crowder, Jr. | 702/183 |
| 2005/0044229 | A1 * | 2/2005 | Brown et al. | 709/226 |
| 2006/0020866 | A1 * | 1/2006 | Lo et al. | 714/741 |
| 2006/0161884 | A1 * | 7/2006 | Lubrecht et al. | 717/104 |
| 2007/0033129 | A1 * | 2/2007 | Coates | 705/36 R |
| 2007/0094281 | A1 * | 4/2007 | Malloy et al. | 707/100 |
| 2007/0100724 | A1 * | 5/2007 | Hollas et al. | 705/36 R |
| 2007/0130009 | A1 * | 6/2007 | Steelberg et al. | 705/14 |
| 2007/0198223 | A1 * | 8/2007 | Ella et al. | 702/188 |
| 2007/0198679 | A1 * | 8/2007 | Duyanovich et al. | 709/223 |
| 2007/0239629 | A1 * | 10/2007 | Ling | 706/12 |
| 2007/0282730 | A1 * | 12/2007 | Carpenter et al. | 705/36 R |
| 2008/0120080 | A1 * | 5/2008 | Nasle | 703/13 |

OTHER PUBLICATIONS

"Improving Performance Analysis Using Resource Management Information", Oct. 15, 2003.*

* cited by examiner

*Primary Examiner*—Neveen Abel Jalil
*Assistant Examiner*—Tarek Chbouki (57) ABSTRACT

A method, system, and medium are provided for of identifying one or more servers associated with meaningful variance characteristics, including receiving a set of current performance data associated with a server; comparing at least a portion of the current performance data against former performance data; determining whether the current performance data varies from the former utilization by a threshold amount; and if so, identifying the server as a candidate for potentially approaching operating capacity.

16 Claims, 5 Drawing Sheets

DETERMINING ABERRANT SERVER VARIANCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Identifying computer servers that begin to behave differently than normal is a desirable action. But servers often inaccurately show out-of-variance metrics. This leads to an erroneous determination that a given server or set of servers are out of variance when they actually are not. These servers may exhibit a normal usage pattern, but it may be offset by an hour or some other timeframe. Or the accepted variance may be so small that almost any change, even a slight change, will result in a server being identified on a variance report (albeit inaccurately). The result is that many of the servers on the variance report should not be present, and much time is wasted by unnecessarily analyzing servers that never really needed to be analyzed.

Ultimately, those people who should normally rely on the accuracy of variance reports end up discounting their value or not relying on them at all. If a variance report is dominated by servers that are not really exhibiting variant traits, and thus are likely working properly, then relevant personnel will tend to dismiss the reports, and the gains sought to be offered by such a report will not only not be realized, but will actually create a worse situation than not having a report because resources were expended to make something that is not used.

The current state of the art could be improved by providing, among other things, a method to determine meaningful and accurate server variance (including variances that are an aberration when compared to past data), which can then be used to accurately identify when a server may be reaching capacity or suffering from some other ailment.

SUMMARY

The presenting invention is defined by the claims below. Embodiments of the present invention solve at least the above problems by providing a system and method for, among other things, predicting when a server may be approaching capacity. The present invention has several practical applications in the technical arts including more accurately identifying servers that are operating in a condition that meaningfully varies from relevant historical conditions. Moreover, reports can be generated that graphically depict high- and low-variance lines that were exceeded by identified servers and the number of variance exceptions on each server for a given time horizon, such as a day. This data can be used to prevent capacity-related outages and service degradation (e.g., degradation of services associated with web applications, billing applications, e-mail, voicemail, purchasing, etc.).

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for identifying servers with meaningful variance from normal operations and for predicting when a server may be approaching capacity.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

In a first aspect, a set of computer-useable instructions provides a method for identifying one or more servers associated with meaningful variance characteristics. The method includes determining a relative performance-variance value of a server by automatically determining that, during a time horizon, the server exhibited one or more aberrant characteristic that varies from historical characteristics of the server associated with a corresponding time horizon; repeating the determining step for a plurality of servers, thereby creating one or more relative performance-variance values; and based on the one or more relative performance-variance values, automatically identifying each server with a relative performance-variance value that exceeds a given threshold value.

In a second illustrative aspect, a method includes receiving a set of current performance data associated with a server; filtering the current performance data to preserve a set of comparison values that are associated with one or more desired time horizons; comparing the comparison values against acceptable ranges derived from a set of historical values associated with the server and with time horizons corresponding to the one or more desired time horizons; and from the comparison, determining whether the server is a candidate for further investigation as to whether it may be approaching capacity.

A final illustrative aspect, a computer-program product is provided that facilitates receiving a set of current performance data associated with a server; comparing at least a portion of the current performance data against former performance data; automatically determining whether the current performance data varies from the former utilization by a threshold amount; and if so, identifying the server as a candidate for potentially approaching operating capacity.

Figure 1:
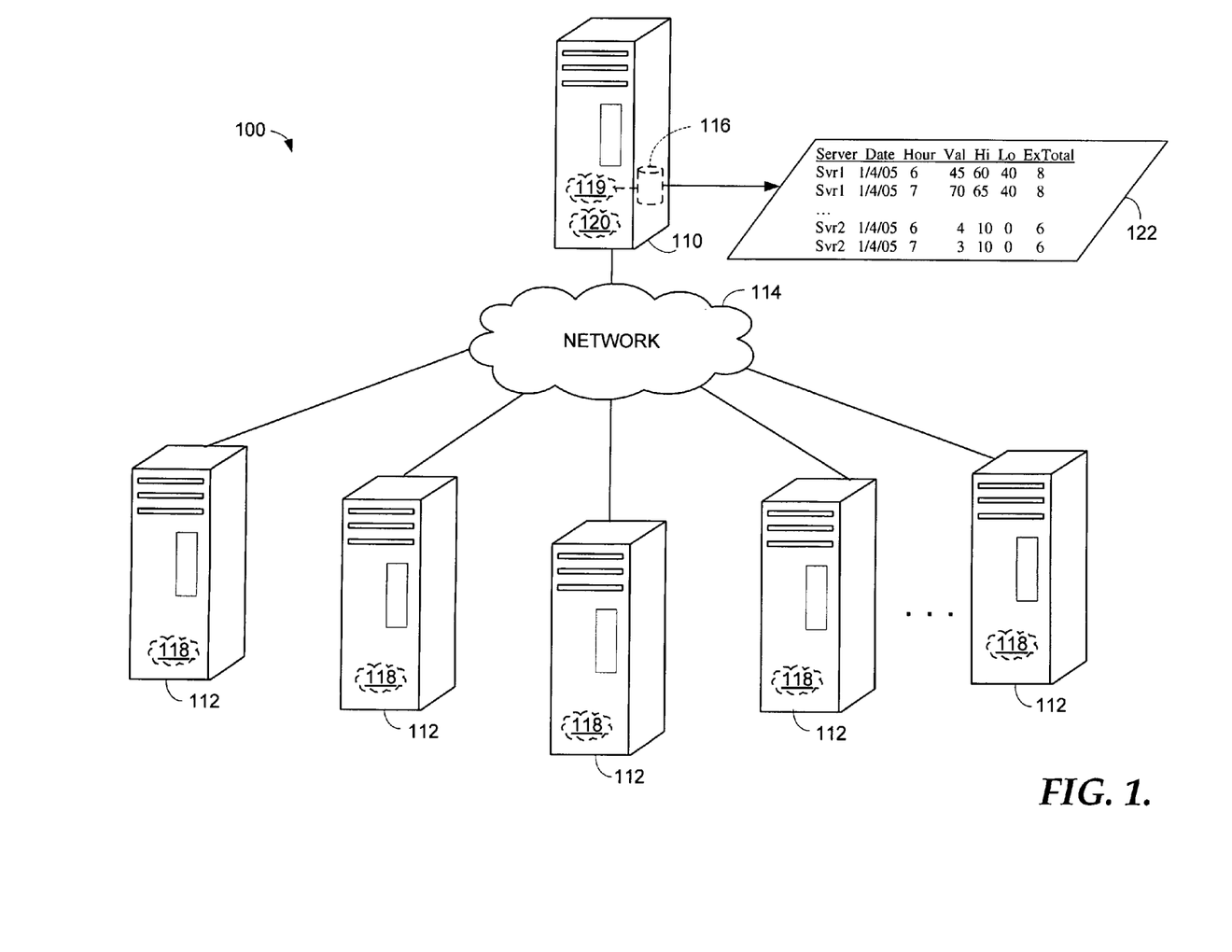
FIG. 1 is a an exemplary operating environment suitable for practicing an embodiment of the present invention.

Turning now to FIG. 1, an illustrative operating environment suitable for practicing an embodiment of the present invention is depicted and referenced generally by the numeral 100. Operating environment 100 includes a first server 110 coupled to a plurality of other servers, each referenced by the numeral 112, by a network 114. Network 114 represents one or more networks. Servers 112 are general-purpose servers that support various applications such as web applications, billing applications, e-mail, voice mail, purchasing, archiving, etc.

Each server has capacity limits, and it is desirable to not exceed the respective capacity limits, and also to know when, or be able to predict to what extent, a server may be approaching a capacity limit. First server 110 and servers 112 are conventional in nature; therefore the inner workings are not expounded upon so as to not obscure the present invention but would readily be appreciated by one of ordinary skilled in the art. For example, each server includes a processor, storage device, memory unit, and various input and output components that facilitate communication with other devices.

In one embodiment, first server 110 includes a control application 119 embodied on one or more computer-readable media and that takes the form of a set of computer usable instructions for performing a method of identifying one or more servers 112 that are operating or have operated in a meaningfully different way than in the past. Although illustratively shown associated with first server 110, control application 119 does not need to reside in server 110 per se, but only be accessible by server 110, or more particularly to a database 116, which in one embodiment stores current performance data associated with servers 112.

Gathering current performance data associated with servers 112 can be accomplished in a variety of ways. For example, in a first embodiment, a performance-data-gathering application 118 is associated with each server 112. Application 118 can periodically push indications of current performance data to a corresponding server side application 120, which either stores the data itself or in another embodiment stores the database in database 116. In an alternative embodiment, server side application 120 may pull current performance data associated with servers 112. In still another embodiment, a single application, as opposed to a client-server type of arrangement, can gather the requisite performance statistics. An illustrative application suitable for gathering such current performance data includes SAS® offered by SAS Institute Inc. of Cary, N.C.

Illustrative current performance data includes CPU (central processing unit or units) utilization, memory utilization, disk utilization, and the like. As will be explained in greater detail below, the data stored in database 116 can be used to create a presentation 122 that summarizes server variances and other metrics.

As servers 112 perform their normal operations, they become taxed and associated with a certain utilization. An indication that a server is reaching capacity or possibly some other fault state is that it begins to exhibit characteristics that vary from historical characteristics over a corresponding period of time. For example, one of the servers 112 may exhibit a spike and percentage utilization on a certain date that exceeds by some threshold amount some average utilization over a previous time period such as a week or a month, etc. However, just because a server experiences a variance in utilization, that may not be enough to have it properly identified as a server approaching capacity or some other fault state. This is because the server may operate differently at different times of day or in different periods of time.

For example, if a server operates normally at 16% utilization during business hours, but then drops to only 1% utilization during nonbusiness hours, such a variance does not indicate a central problem with the server. Therefore, in a method according to an embodiment of the present invention, data values are compared across corresponding time horizons so as to accurately determine whether a server is behaving sufficiently differently to warrant a closer look.

Figure 2:
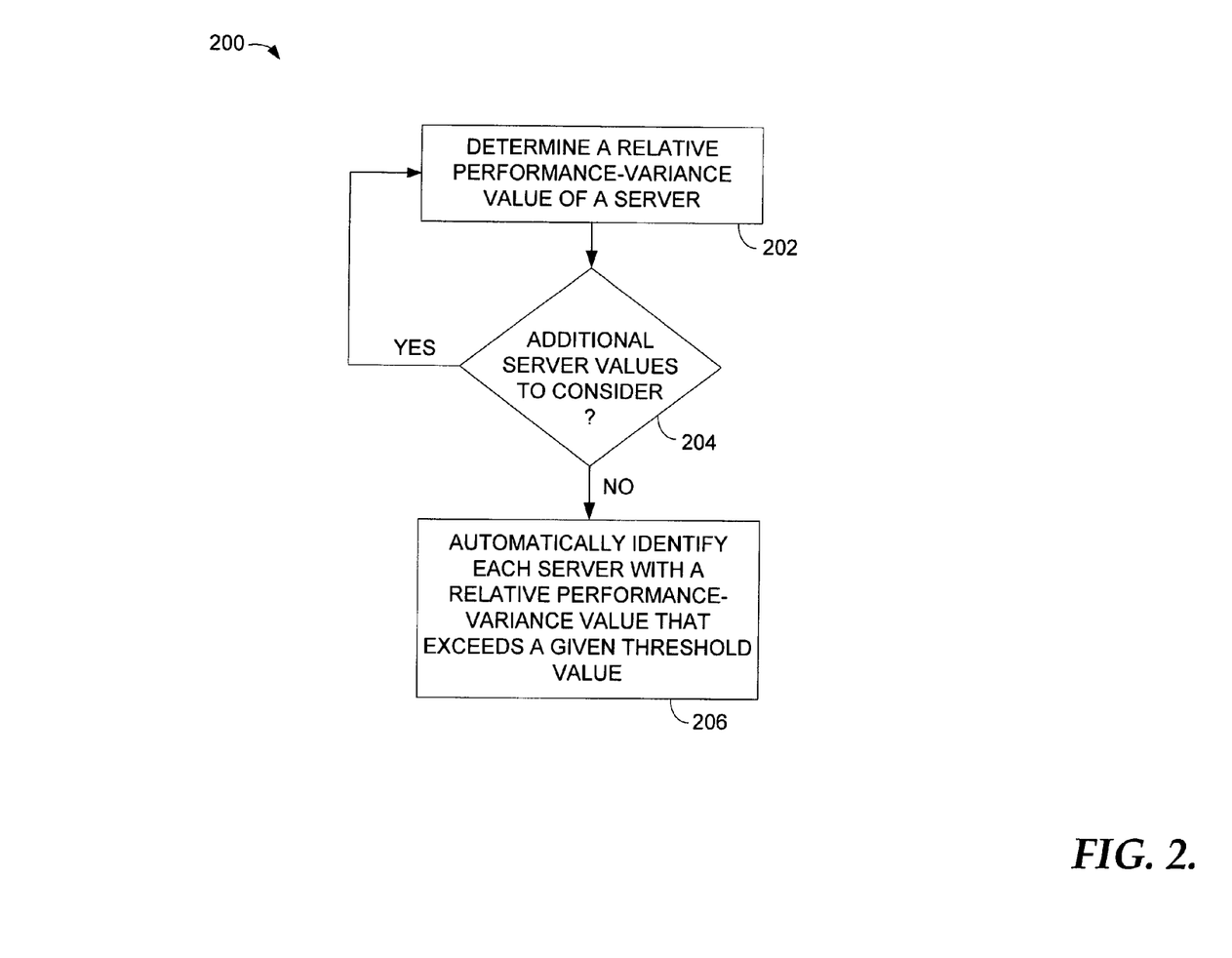
FIG. 2. is a first flow diagram that illustrates a method of identifying servers associated with meaningful variance characteristics according to an embodiment of the present invention.

Turning now to FIG. 2, an illustrative method for identifying a set of servers that are associated with meaningful variance characteristics is shown and referenced generally by the numeral 200. At a step 202, a relative performance-variance value of a server, such as server 112, is determined. In one embodiment, such a determination is made by automatically determining that the server exhibited aberrant characteristics during a time horizon, where those characteristics vary from some historical characteristics of a corresponding time horizon. For example, metrics gathered during a certain time frame will be considered with average metrics over a corresponding time frame. Thus, utilization data from 7 p.m. to 8 p.m. of a first date may be compared to average utilization from 7 p.m. to 8 p.m. over the previous seven days or thirty days or whatever time frame is best suited according to a particular implementation.

At a step 204, a determination is made as to whether additional server values are to be considered. If so, then processing reverts to step 202, where the applicable data is evaluated. In one embodiment, current performance data is gathered from servers 112 and stored in database 116. This data storage can take the form of a table where the various items are stored in one or more data structures. In such an embodiment, various rows of data will be analyzed to determine whether certain servers are exhibiting meaningful variance; that is behavior that varies by a given threshold amount from some historical benchmark.

In another embodiment, servers 112 may be analyzed on the fly. In such an embodiment, each server 112 may be queried by application 120 and/or in connection with application 114 to glean current performance data associated with servers 112. This process can be done serially or in parallel.

If there are no additional server values to consider, then processing advances to a step 206, where each server with a relative performance-variance value that exceeds some given threshold value is automatically identified without user intervention. This process will also be explained in greater detail below.

In one embodiment, a set of current performance data associated with a server is received and then filtered to preserve a set of comparison values that are associated with the respective time horizons. For example, performance data gathered from a server and associated with a time horizon from 8 a.m. to 9 a.m. may itself have aberrations. These aberrations will be filtered out so that what remains is a set of comparison values. These comparison values are what can be compared to historical averages or benchmarks. The benchmark values are historical values that are associated with the server and with the corresponding time horizons. Again, historical values may be historical values over a period of say seven days, thirty days, sixty days or the like. In one embodiment, the time horizons are portions of a day, such as hourly, and the historical characteristics are gathered over a period of days preceding the time horizon.

Figures 3A, 3B:
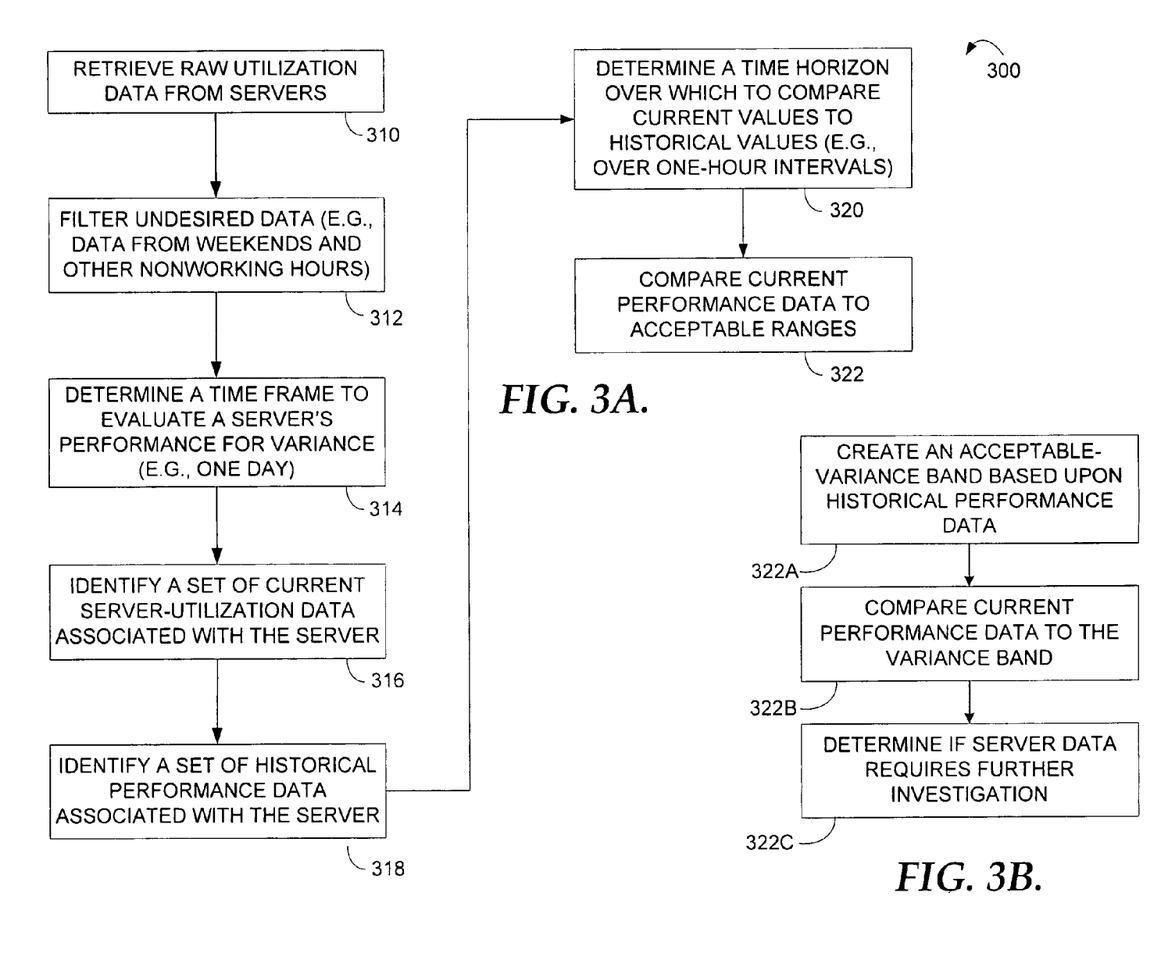
FIGS. 3A and 3B are flow diagrams that illustrates identifying one or more servers associated with meaningful variance characteristics according to an embodiment of the present invention.

Turning now to FIG. 3A, another method according to an embodiment of the present invention is depicted for identifying one or more servers associated with meaningful variance characteristics as referenced generally by the numeral 300. At a step 310, current performance data, which can be raw utilization data, is retrieved from servers 112. As previously mentioned, current performance data may include a data associated with CPU utilization, memory utilization, disk utilization, etc. At a step 312, the current performance data of step 310 is filtered. In one embodiment, filtering takes the form of removing undesired data, such as data gathered from weekends or other nonworking hours. This step can be accomplished by removing undesired data or by keeping desired data. If some operating condition created a reason as to why server metrics or current performance data associated with that circumstance should not be relied upon, then such can be accounted for at step 312. The desirable data provides a set of comparison values that are associated with various time horizons.

At a step 314, a determination is made as to a desired time frame to evaluate a server's performance for variance. Examples may include a day, a week, or time horizons in between or beyond the same. The time frame to evaluate a server's performance for variance will be a time frame over which performance data will be observable. For example, if a time frame is chosen to be one day, then current performance data associated with one day will ultimately be presented to be relied upon. It may be the case that the same time frame is always used, therefore the step of determining a time frame is reduced to reading a predetermined value. But in another context, the time frame may be variable, and step 314 can be an opportunity for a user to provide input as to its desired time frame to evaluate a server's performance to determine whether it is operating or has recently operated in a meaningfully variant state.

At a step 316, a set of current server-utilization data associated with the server, such as server 112, is identified. This set of current server-utilization data can be the comparison values, which would come from the raw current performance data of step 310 that was filtered at step 312.

At a step 318, a set of historical performance data values associated with the corresponding server are identified. Because like periods of time are being compared with each other, historical data may extend into months or more. As mentioned, if the server utilization data in step 316 corresponded to a certain hour of the day, then the set of historical performance data values will also be for the same hour of the day so as to compare apples to apples.

At a step 320 a determination is made as to a time horizon over which to compare the current values to historical values; for example over one-hour intervals. Comparison can be made over two-hour intervals or day intervals or week intervals, etc. At a step 322, current performance data are evaluated against acceptable data ranges. FIG. 3B depicts an illustrative process for such evaluation.

With reference to FIG. 3B, at a step 322A an acceptable-variance range is determined for each time interval based upon the historical performance data at step 318. That is, highs and lows can be generated that define an acceptable-variance band, or range, based on historical data. At a step 322B, the current server-performance data of step 316 is compared to the variance band at step 322 based on the intervals of step 320. This step includes benchmarking at least a portion of the comparison values against the acceptable-variance band for that server in one embodiment.

If a comparison value falls within the acceptable-variance range, then such a value would not be judged to be an exception. But any values that fall outside of the acceptable variance range may be counted as exceptions for that server. In a step 322C, a determination is made as to whether the server is identified as one having meaningful variance and requiring further investigation; such may be the case if that server has a sufficiently high number of exceptions, or if the severity of an exception meets some criteria. In one embodiment, a server shows meaningful variance if the number of exceptions exceeds some threshold amount. In some embodiments this threshold amount is an absolute number, or a portion of total values, such as say 10%, 20%, or whatever the an administrator deems appropriate.

Historical performance data is used to derive acceptable ranges that serve as benchmarks for current performance data. In one embodiment, these ranges can take the form of acceptable-variance bands that can be plotted against utilization data to help a reader visually see which values are within acceptable parameters and which values are not. An initial explanation in greater detail will be provided with reference to FIG. 4, which depicts an illustrative graph referenced by the numeral 400 that includes performance of an illustrative server, referred to herein as server "alpha," on an intraday time horizon for various days.

Figure 4:
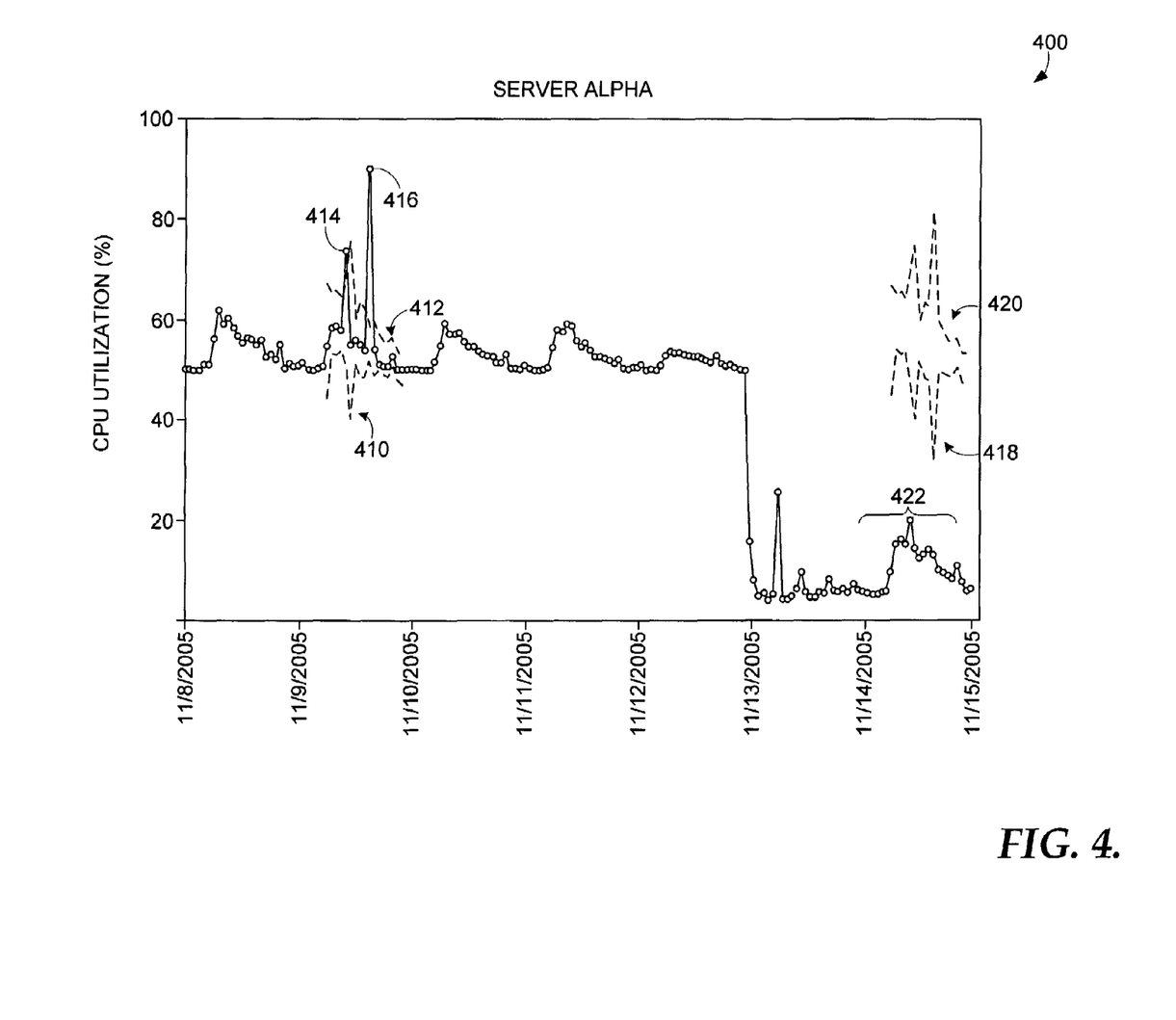
FIGS. 4 and 5 depicts illustrative reports that depict data associated with identifying one or more servers associated with meaningful variance characteristics according to an embodiment of the present invention.

As shown CPU utilization is measured on the Y axis, and time is on the X axis. In the embodiment shown, each individual data point represents the CPU utilization associated with a certain hour of the day. Any time frame can be selected, and for illustrative purposes, a set of acceptable-variance bands is shown for the time period spanning Nov. 9, 2005 to Nov. 10, 2005, including a low band 410 and a high band 412. In one embodiment, each of these bands 410 and 412 may have been generated by finding the hourly average and standard deviation for a time horizon preceding Nov. 9, 2005, such as eleven comparable days preceding that day. For example, if Nov. 9, 2005 fell on a Wednesday, then the acceptable-variance bands may be created based on the hourly data from only previous corresponding Wednesdays.

Assuming that the performance of server "alpha" is to be evaluated from the time frame spanning November 2009 through November 2010, then it is readily apparent that, for example data values 414 and 416 fall beyond acceptable limits as defined by acceptable-variance band 412. This being the case, data points 414 and 416 would amount to two exceptions on that day. In one embodiment, these exceptions are summed and if the number of exceptions exceeds a threshold amount, say four for example, then server alpha would be added to a list, which will ultimately be depicted to a user, which in one form includes the data illustrated by reference numeral 122 on FIG. 1.

Numeral 422 references the server data values that span Nov. 14, 2005 through Nov. 15, 2005; this data would be benchmarked against the acceptable-variance bands identified by numerals 418 and 420, resulting in approximately 17 exceptions because all of the data points would generate exceptions. Thus, server "alpha" would be attributed with 17 or so exceptions for that time frame and would be added to a list along with its corresponding data so that an observer of such a list or a machine would be equipped with information that can be used to indicate server "alpha" as a candidate for further inspection.

Figure 5:
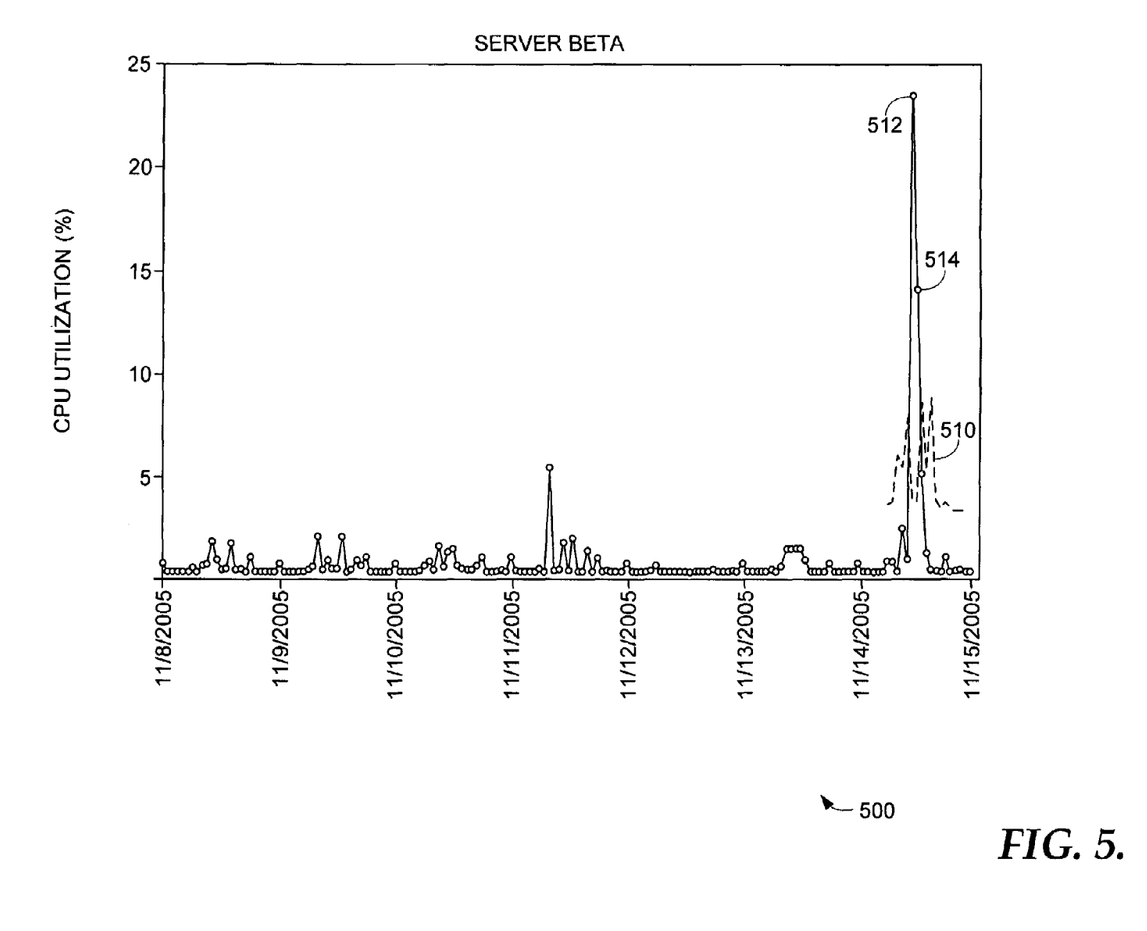

Another exemplary use of acceptable-variance bands is shown in connection with FIG. 5, which shows a graph referenced generally by the numeral 500. In this embodiment, only a high band 510 is shown; a low band at zero can be assumed. Points exceeding the variance band generate exceptions. Thus, according to a method of the present invention, current performance data associated with server "beta" would be gathered for a certain time frame, such as hourly between Nov. 14, 2005 and Nov. 15, 2005. Historical data corresponding to the same time frame if desired could be used to generate the acceptable-variance bands and test whether any performance characteristics of server beta sufficiently vary from historical operations.

In the illustrative example shown, an acceptable-variance band 510 depicts a ceiling of acceptable-utilization values. But as shown, data point 512 at approximately 24% utilization, and data point 514 at approximately 14% utilization both exceed the corresponding acceptable-variance band 510, and as such would generate exceptions, but possibly not enough exceptions to be added to a list to be ultimately displayed to a user or used by another machine. In this way, only the servers that are more likely to actually be operating in or have recently operated in a truly variant state will be depicted to a user.

Of course acceptable-variance bands, such as bands 410, 412, 418, 420 and 510 are not necessary to practicing the present invention, inasmuch as they are graphical depictions of actual data. Graphical depictions are not necessary for the present invention but provide a viewer with a way to readily observe which servers are exhibiting sufficiently variant characteristics from normal.

Various methods for calculating the variance band data points depicted illustratively on FIGS. 4 and 5 can be derived in various fashions. For example on a first embodiment, each data point represents the historical average plus or minus a multiple of the standard deviation for each server by hour. The standard deviation multiplier can be varied in some embodiments to easily change the sensitivity to data variability. For example, the high band may be generated by calculating the average plus three standard deviations of all the historical values of a particular hour, doing the same for each hour, and then showing the same in linear fashion.

Similarly, a low-variance band may be generated by depicting a line that maps for each hour an average less three standard deviations of the historical values. In some embodiments this type of scaling is not employed, and in other embodiments this type of scaling may be employed to a greater degree depending upon the level of filtering desired by a user. In one embodiment, a minimum variance is also employed such that if the calculated variance range is too narrow (the high and low points are too close), then the minimum variance is used by default. Exceptions are counted for each point lower than the low band or higher than the high band. That is, for each data value lower than the corresponding low benchmark and each current high-data value higher than the corresponding high benchmark.

In one embodiment, the output of the data may take the form of a list such as that illustratively shown by referencing numeral 122 on FIG. 1. Returning to FIG. 1, list 122 shows identifying indicia of each server, a corresponding date, an hour of the day, a corresponding server value, high value, low value, and an exception total for that hour of the day. As illustratively shown, "SVR1" is associated with eight exceptions. Provided that eight exceptions exceeds a threshold amount, the server is identified as a candidate to be further examined to ensure that if it is approaching capacity limits, then it can be replaced before impeding the services it supports, such as e-mail, phone mail, and a litany of other applications.

The present invention includes a dynamic nature as a beneficial method. The acceptable-variance range can change every time there is new performance data. Most current capacity exception reports are based upon hard utilization limits, like 80% CPU Utilization. The instant invention can detect aberrant behavior in servers before they reach those fixed utilization limits, and provides the opportunity to fix the problem before it becomes a problem.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more tangible computer-storage media having computer-useable instructions embodied thereon for performing a method of identifying a server associated with meaningful variance characteristics, the method comprising:
   receiving a set of current performance data associated with a first server;
   filtering statistical aberrations from the set of current performance data associated with the first server,
   1) wherein the statistical aberrations are determined based on comparing the set of current performance data associated with the first server to benchmark ranges determined from a set of modified historical performance data associated with the first server, and
   2) wherein the modified historical performance data includes historical performance data associated with the first server that has been modified to remove aberrations of data;
   generating a set of relative performance-variance values associated with the first server based on the filtered statistical aberrations of the first server, wherein each relative performance-variance value is associated with a time horizon comprising a specified duration of time occurring periodically on given days of the week at given times of day;
   repeating the filtering of statistical aberrations step for a plurality of servers;
   repeating the generating of relative performance-variance values based on the filtering statistical aberrations step for the plurality of servers, thereby generating a set of relative performance-variance values associated with each of the plurality of servers;

determining from the relative performance-variance values associated with the first server and the plurality of servers boundaries that define acceptable-variance bands associated with each time horizon associated with the relative performance-variance values associated with the first server;

benchmarking at least a portion of the relative performance-variance values associated with the first server against the acceptable-variance bands to count a total number of exceptions;

based on the relative performance-variance values associated with the first server, automatically identifying the first server comprises at least one relative performance-variance value that exceeds a given threshold value associated with an acceptable-variance band; and based on the automatic identifying the first server comprises at least one relative performance-variance value that exceed a given threshold value associated with an acceptable-variance band, determining the first server is a candidate for further investigation as to whether the first server is approaching a fault state.

2. The media of claim 1, wherein each time horizon is a portion of a day.

3. The media of claim 2, wherein the historical performance data is gathered over a period of days preceding the time horizon.

4. The media of claim 1, the determining whether the server is a candidate for further investigation includes denoting the server if the total number of exceptions exceeds a threshold amount.

5. The media of claim 4, wherein the denoting includes storing an indication that identifies the server.

6. The media of claim 1, wherein the automatically identifying includes presenting on a presentation component identifying indicia respectively associated with the identified first server.

7. A method for the communication of the computer-useable instructions from a source to a destination for measuring server variance, the communication including downloading a copy of the computer-useable instructions to the destination, the method comprising:

measuring a set of current performance data associated with a first server at the destination;

receiving the set of current performance data associated with the first server at the source;

determining a time horizon over which to compare the current performance data associated with the first server to the historical performance data associated with the first server, wherein the time horizon comprises a characteristic length of time occurring at a characteristic date;

accessing a set of historical performance data associated with the first server at the source, wherein the historical performance data is filtered to remove statistical aberrations of the data, and further wherein the set of historical performance data associated with the first server indicates a threshold for denoting instances of exceptional server performance associated with the server and the corresponding time horizon, wherein further the threshold for denoting instances of exceptional server performance is based on relative performance-variance values based on statistical aberrations associated with a plurality of servers;

comparing values in the set of current performance data associated with the first server to the threshold for denoting instances of exceptional server performance to determine if a total of instances exceeding the threshold is greater than an acceptable number of instances of exceptional server performance;

indicating that the instances of exceptional server performance in the current set of performance data associated with the first server exceed the acceptable number of instances; and based on the instances of exceptional server performance in the current set of performance data associated with the first server exceeding the acceptable number of instances, determining the first server is a candidate for further investigation as to whether the first server is approaching a fault state, wherein the filtering of the historical performance data to remove statistical aberrations of the data includes identifying data values associated with the historical performance data that deviate from an average of the data values by a threshold amount.

8. A method of identifying one or more servers associated with meaningful variance characteristics, the method comprising:

receiving a set of current performance data associated with a server;

filtering statistical aberrations from the current performance data to preserve a set of comparison values that are associated with one or more desired time horizons, wherein the one or more desired time horizons comprise specified durations of time beginning on given days of the week at given times of day;

comparing the comparison values against acceptable ranges derived from a set of historical values to determine a total number of exceptions to acceptable ranges, wherein the set of historical values are filtered to remove statistical aberrations of the data, and further wherein the set is associated with 1) the server and with 2) time horizons corresponding to the one or more desired time horizons, including corresponding durations, days of the week, and times of day, wherein the time horizon comprises a characteristic length of time occurring at a characteristic date; and based on the comparison, determining the server is a candidate for further investigation as to whether the server is approaching a fault state;

wherein filtering statistical aberrations of the current performance data includes identifying data values associated with the current performance data that deviate from an average of the data values by a threshold amount.

9. Utilizing the method of claim 8 to predict when a server approaching capacity.

10. A computer-program product stored on computer storage medium executed on one or more processors for facilitating a method of identifying a server as a candidate for potentially approaching operating capacity, the method comprising:

receiving a set of current performance data associated with a server;

comparing at least a portion of the current performance associated with the server data against former performance data associated with the server recorded during one or more instances of time durations equal to the at least a portion of the current performance data associated with the server and corresponding to a same starting day and a same starting time of day, wherein the former performance data associated with the server comprises at least one threshold for denoting instances of exceptional server performance based on relative performance-variance values based on statistical aberrations associated with a plurality of servers, and further wherein the comparing is utilized to determine instances of performance of the server that are categorized as exceptions to acceptable performance;

automatically determining whether the current performance data associated with the server varies from the former performance data associated with the server by a threshold amount of exceptions; and based on automatically determining the current performance data associated with the server varies from the former performance data associated with the server by a threshold number of exceptions, determining the server is a candidate for further investigation as to whether the server is approaching a fault state, wherein statistical aberrations associated with a plurality of servers include data values that deviate from an average of the data values by a threshold amount.

11. Utilizing the computer-program product of claim 10 to identify one or more servers that should be investigated for potentially advancing toward a fault state.

12. The media of claim 1, wherein statistical aberrations comprise variance in utilization causing a server to respond differently in different periods of time.

13. The method of claim 7, wherein statistical aberrations comprise variance in utilization causing a server to respond differently in different periods of time.

14. The method of claim 8, wherein statistical aberrations comprise variance in utilization causing a server to respond differently in different periods of time.

15. Utilizing the computer-program product of claim 10, wherein statistical aberrations comprise variance in utilization causing a server to respond differently in different periods of time.

16. The method of claim 7, wherein the corresponding time horizon comprises a specified duration of time beginning on a given day of the week at a given time of day.

* * * * *